(12) United States Patent
Nagae (10) Patent No.: US 6,973,261 B2
(45) Date of Patent: Dec. 6, 2005

(54) CAMERA

(75) Inventor: Ryuichi Nagae, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 10/777,255

(22) Filed: Feb. 12, 2004

(65) Prior Publication Data

US 2004/0165874 A1    Aug. 26, 2004

(30) Foreign Application Priority Data

Feb. 24, 2003    (JP) .............................. 2003-046180

(51) Int. Cl.⁷ ............................................. G03B 13/10
(52) U.S. Cl. .......................... 396/84; 396/85; 396/379
(58) Field of Search ............................ 396/84, 85, 378, 396/379

(56) References Cited

U.S. PATENT DOCUMENTS 4,967,219 A * 10/1990 Morisawa et al. ............ 396/84
5,083,146 A *  1/1992 Ueda ............................ 396/62

FOREIGN PATENT DOCUMENTS

JP    H9-211300      8/1997    ............ G02B 7/09
JP    2001-324749    11/2001   ............ G03B 17/04

* cited by examiner

*Primary Examiner*—W. B. Perkey
(74) *Attorney, Agent, or Firm*—Cowan, Liebowitz & Latman, P.C.

(57) ABSTRACT

A camera can reduce the size of the camera. The camera comprises a lens barrel which allows the focal length of an image-taking optical system to be changed, a view finder unit for observing an object image, a cam member having a cam for driving the view finder unit, which moves around the lens barrel in a first area and a barrel driving mechanism which is arranged around the lens barrel in a second area and drives the lens barrel.

4 Claims, 7 Drawing Sheets

CAMERA

BACKGROUND OF THE INVENTION

1. Field of the Invention

The present invention relates to a structure of a camera having a lens barrel and an optical view finder.

2. Description of the Related Art

There are conventionally film cameras using a silver film and digital cameras which can take images using an image-pickup element and these cameras are either of a zoom type in which the focal length of the image taking optical system is changeable or of a single focus type with a fixed focal length. In the zoom type camera, a lens barrel provided with an image-taking lens moves in the direction of the optical axis in order to reduce the size of the camera when the image-taking operation is not performed and move the image-taking lens to a position corresponding to a desired focal length.

For the purpose of improving portability of a camera, miniaturization of the camera, for example miniaturization of its internal mechanism is being sought in recent years.

One of effective technologies for reducing the size of a camera is miniaturization of the lens barrel. This is because the lens barrel of the camera usually has a substantially circular cross portion and reducing the diameter of the lens barrel is effective in reducing the size of the camera in the vertical and horizontal directions, that is, reducing the size of the entire camera.

Reducing the size of the lens barrel requires not only miniaturization of the image-taking lens provided in the lens barrel but also miniaturization of a barrel driving mechanism including a barrel driving motor for driving the image-taking lens, etc.

On the other hand, a camera is provided with a view finder unit for observing an object image (observing composition) during image taking. A film camera is generally provided with an optical view finder unit having a view finder optical system and a digital camera is provided with an external liquid crystal display unit which displays an image obtained by using the image-pickup element and an optical view finder unit. In a zoom camera provided with an optical view finder unit, a view finder optical system also operates according to a change (zooming operation) of the focal length of an image-taking lens so that the area of the image taken matches the area of the field of view of the optical view finder unit.

When reducing the size of a camera provided with an optical view finder unit, it is important to not only reduce the size of the lens barrel but also reduce the size of a mechanism of interlock between the lens barrel and optical view finder unit in a simple structure. This is because when the interlock mechanism increases in size, the distance between the lens barrel and the optical view finder unit increases by the space for arrangement of the interlock mechanism and the size of the camera increases accordingly.

Thus, as disclosed in Japanese Patent Application Laid-Open No. H9 (1997)-211300 (hereinafter referred to as "Document 1") or Japanese Patent Application Laid-Open No. 2001-324749 (hereinafter referred to as "Document 2"), there is a camera which interlocks the lens barrel with the optical view finder unit through a mechanism having a simple structure.

The zoom type camera is provided with a plurality of barrel driving gears (reduction gear train) which interlock the lens barrel with the barrel driving motor, and the barrel driving motor and, in the film camera, barrel driving gears are located below the lens barrel for reasons related to the relationship between a spool chamber which rewinds the film and a film loading chamber.

On the other hand, the digital camera is free of constraints on such arrangement of the spool chamber and film loading chamber, etc., and has a higher degree of freedom of layout of the barrel driving motor and barrel driving gears compared to the film camera. In general, the barrel driving motor and barrel driving gears are often located in the lower part of the camera for reasons related to the housing space for the battery and storage medium.

However, placing the barrel driving motor and barrel driving gears in the lower part of the camera is effective in reducing the size of the camera in the horizontal direction (lateral direction) but not effective in reducing the size of the camera in the vertical direction (longitudinal direction).

Furthermore, reducing the size of the camera in the vertical direction requires consideration to be given to not only the space for arrangement of the barrel driving motor and barrel driving gears but also the space for arrangement of the interlock mechanism of the optical view finder unit located above the lens barrel.

In the above described Documents 1 and 2, the size of the camera is reduced by adopting a simple structure of interlock mechanism which interlocks the lens barrel with the optical view finder unit. But Documents 1 and 2 do not disclose any relationship of arrangement between the above described locking mechanism and the above described barrel driving motor, or between the above described locking mechanism and the above described barrel driving gears.

That is, it is not possible to further reduce the size of the camera by only placing barrel driving motor and barrel driving gears at optimal positions for miniaturization or making the interlock mechanism simpler.

SUMMARY OF THE INVENTION

One aspect of the camera of the present invention comprises a lens barrel which allows the focal length of an image-taking optical system to be changed, a view finder unit for observing an object image, a cam member having a cam for driving the view finder unit, which moves around the lens barrel in a first area and a barrel driving mechanism which is arranged around the lens barrel in a second area and drives the lens barrel. Here, the section positioned the second area side in the first area and the second area are overlapped with each other, and the cam member has recess portion to avoid contacting the barrel driving mechanism when the cam member moves into the section.

The features of the camera of the present invention will become more apparent from the following detailed description of a preferred embodiment of the invention with reference to the drawings.

DETAILED DESCRIPTION OF THE PREFERRED EMBODIMENTS

With reference now to the attached drawings, a camera which is an embodiment of the present invention will be explained below.

Figure 1:
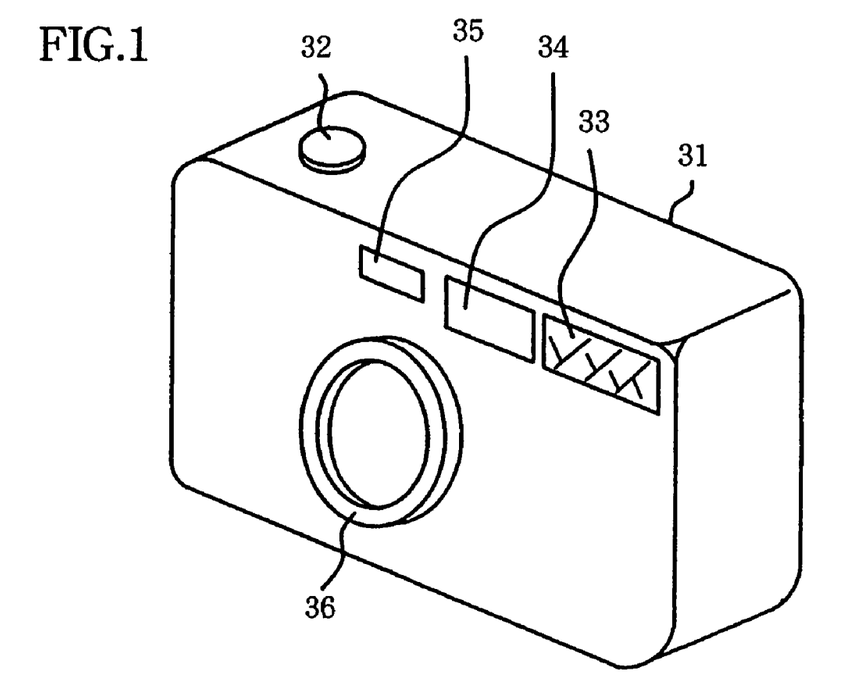
FIG. 1 is an external perspective view of a camera which is an embodiment of the present invention.

FIG. 1 is an external perspective view of a camera of this embodiment. In FIG. 1, reference numeral 31 denotes a camera body, which contains various members necessary for image taking. Reference numeral 32 denotes a release button which is operated through two-stage depressing operations. An image-taking preparation operation (photometric operation or focusing operation, etc.) is started by a half-depressing operation of the release button 32 and an image-taking operation (exposing a film or generation of image data using an image pickup element such as CCD) is started by a full-depressing operation of the release button 32.

Reference numeral 33 denotes an electronic flash unit which irradiates an object with illumination light, 34 denotes a light projection unit which projects AF fill light, etc., and 35 denotes an optical view finder unit for observing an object image. Reference numeral 36 denotes a lens barrel which can protrude or retract in the direction of the optical axis.

When the power of the camera body 31 is OFF, the lens barrel 36 is housed in the camera body 31 (collapse state). When the power of the camera body 31 is turned ON, the lens barrel 36 protrudes from the camera body 31 and then is an image-taking state (between a wide-angle state and a telephoto state).

Figure 2:
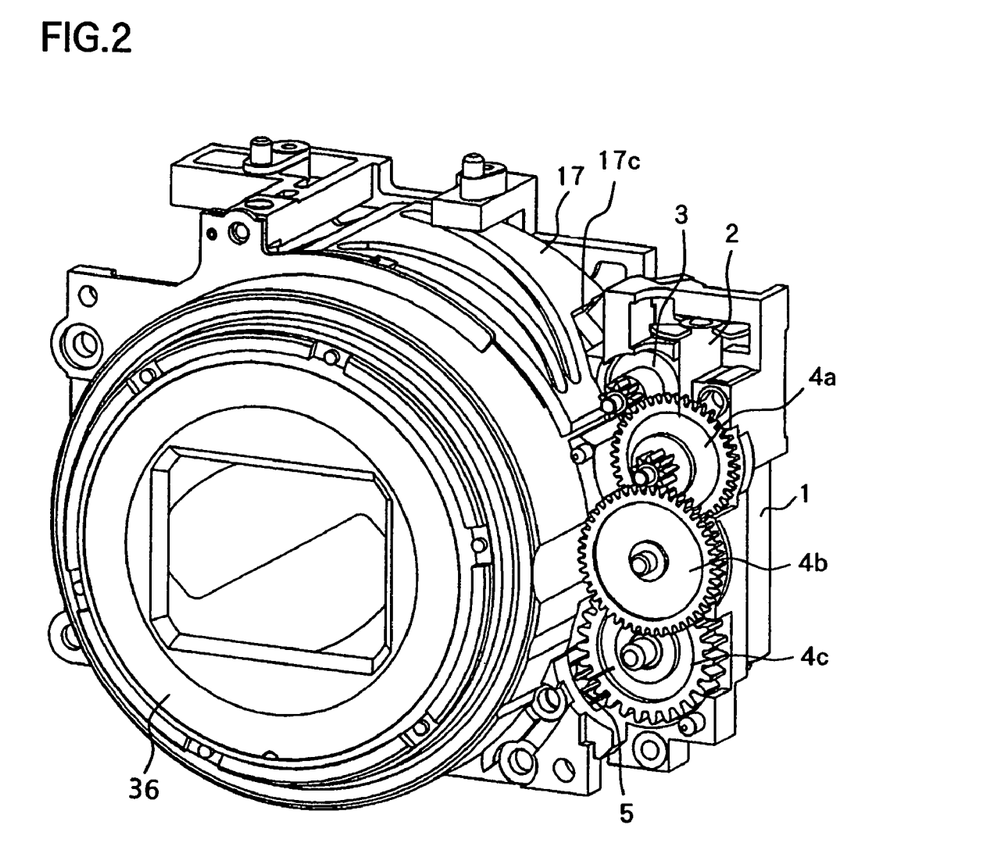
FIG. 2 is an external perspective view showing a driving mechanism of a lens barrel.

FIG. 2 is an external perspective view showing the lens barrel and the driving mechanism of the lens barrel.

Reference numeral 1 denotes a barrel driving motor which drives a lens barrel 36, 2 to 5 denote a reduction gear train which reduce the torque of barrel driving motor 1 and transmit it to the lens barrel 36. Reference numeral 2 denotes a worm gear attached to the rotation shaft of the barrel driving motor 1. Reference numeral 3 denotes a worm wheel which engages with the worm gear 2 and has a gear engaging with a gear 4a which will be described later.

Reference numeral 4a denotes a barrel driving gear having a two-stage gear structure of a large gear and a small gear of different diameters. The large gear of the barrel driving gear 4a engages with the gear of the worm wheel 3.

Reference numeral 4b denotes a barrel driving gear having a two-stage gear structure of a large gear and a small gear of different diameters. The large gear of the barrel driving gear 4b engages with the small gear of the barrel driving gear 4a. Reference numeral 4c denotes a barrel driving gear and engages with the small gear of the barrel driving gear 4b and a barrel driving gear 5 which will be described later.

Reference numeral 5 denotes a barrel driving gear, which is located in the final stage of the reduction gear train and engages with a gear formed on the external wall of the lens barrel 36 as will be described later. Reference numeral 17 denotes a view finder driving member for driving the optical view finder unit and formed around the perimeter of the lens barrel 36 (rotary cylinder 8 which will be described later).

As shown in FIG. 2, the camera according to this embodiment is provided with a barrel driving mechanism having the barrel driving motor 1 and the reduction gear train 2 to 5 on the side of the lens barrel 36 (on the right side of the lens barrel 36 viewed from the front), that is, in a partial area of the perimeter of the lens barrel 36 and a view finder driving member (cam member) 17 is provided on the upper surface of the lens barrel 36. This structure allows the size of the camera to be reduced in the vertical direction compared to the case where the barrel driving mechanism is placed below the lens barrel 36.

Then, the structure and operation of the lens barrel 36 and the interlock between the lens barrel 36 and optical view finder unit will be explained.

Figure 3:
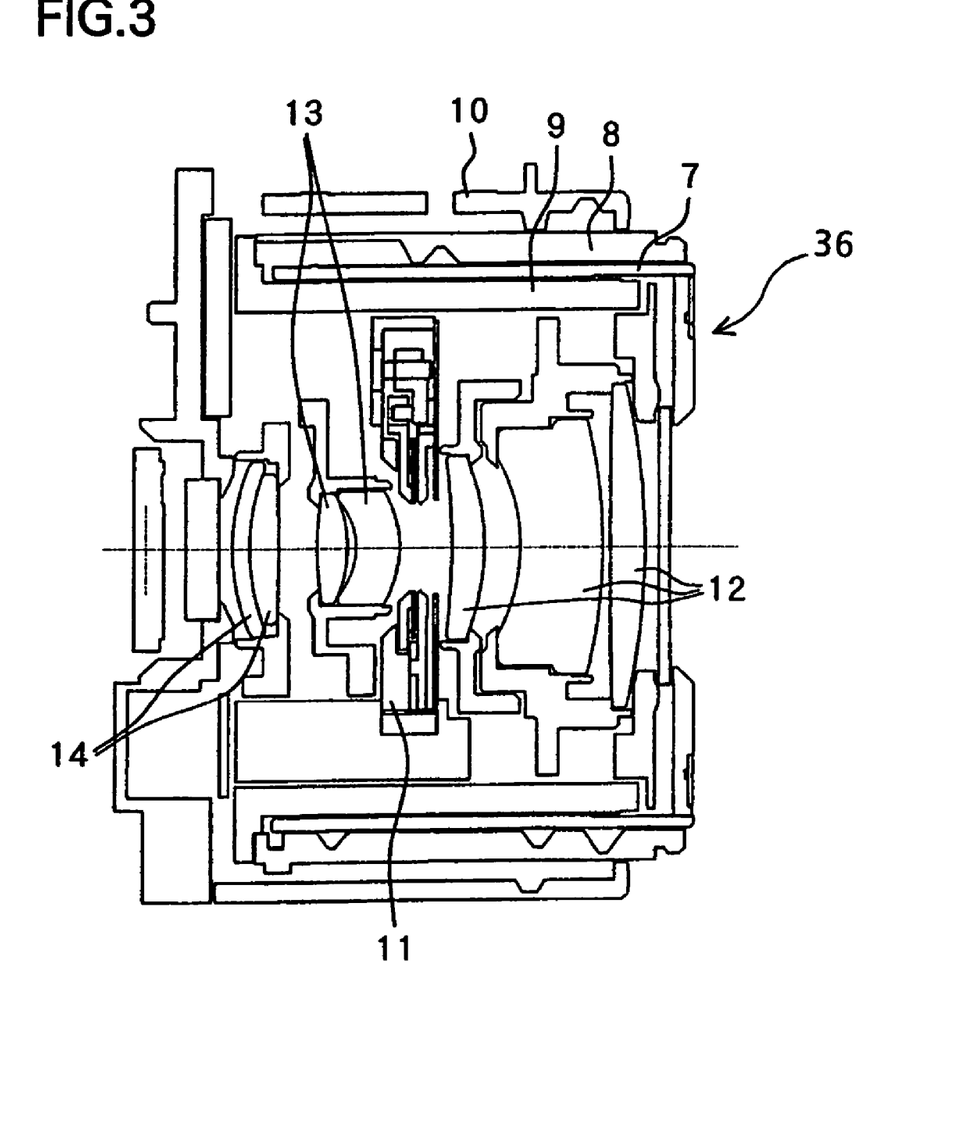
FIG. 3 is cross-sectional view in the direction of the optical axis of the lens barrel.

FIG. 3 is a cross-sectional view in the direction of the optical axis of the lens barrel 36. In FIG. 3, reference numeral 7 denotes a first rectilinear cylinder provided with a first image-taking lens unit 12 which can only move in the direction of the optical axis.

Reference numeral 8 denotes a rotary cylinder which can rotate around the optical axis by receiving a driving force from the barrel driving motor 1. On the inner surface of the rotary cylinder 8, a plurality of cam groove portions for driving a holding member which holds a second image-taking lens unit 13 and shutter unit 11 and the first rectilinear cylinder 7 is formed.

Each of a plurality of cam groove portions formed on the rotary cylinder 8 engages with projection portion formed on the external wall of the first rectilinear cylinder 7 and projection portion formed on the external wall of the above described holding member.

On the other hand, a view finder driving portion (8a in FIG. 6) for driving the view finder driving member 17 on the outer surface of the rotary cylinder 8 as will be described later.

Reference numeral 9 denotes a second rectilinear cylinder provided with a guide portion which engages with the first rectilinear cylinder 7 and guides the first rectilinear cylinder 7 in the direction of the optical axis. Furthermore, the second rectilinear cylinder 9 is held in a manner slidable on the rotary cylinder 8 so that it does not rotate around the optical axis together with the rotary cylinder 8.

Reference numeral 10 denotes a fixed cylinder which holds the lens barrel 36 (rotary cylinder 8). On the inner surface of the fixed cylinder 10, cam groove portions which engage with the rotary cylinder 8 to move the rotary cylinder 8 in the direction of the optical axis is formed. Reference numeral 11 denotes a shutter unit having a plurality of light-blocking blades which controls exposure when the plurality of light-blocking blades move into or out of the image-taking optical path.

Reference numeral 12 denotes a first image-taking lens unit, 13 denotes a second image-taking lens unit and 14 denotes a third image-taking lens unit.

Operations of the lens barrel 36 having the above described structure will be explained using FIG. 2 and FIG. 3.

According to a control signal from a control circuit (not shown) provided in the camera body 31, power is supplied to the barrel driving motor 1. This causes the barrel driving motor 1 to rotate and this torque is transmitted to the lens barrel 36 (rotary cylinder 8) through the reduction gear train 2 to 5 and the rotary cylinder 8 thereby rotates around the optical axis.

When the rotary cylinder 8 rotates around the optical axis, the rotary cylinder 8 also moves in the direction of the optical axis by engagement with the fixed cylinder 10. When the rotary cylinder 8 rotates around the optical axis, the first rectilinear cylinder 7 and the holding member move in the direction of the optical axis by engagement with the cam groove portions of the rotary cylinder 8. Here, the first rectilinear cylinder 7 and the holding member only move in the direction of the optical axis by engagement with the second rectilinear cylinder 9.

Furthermore, when the rotary cylinder 8 moves in the direction of the optical axis, the second rectilinear cylinder 9 also moves in the direction of the optical axis together with the rotary cylinder 8.

Through the above described operations, it is possible to move the first image-taking lens unit 12 and second image-taking lens unit 13 up to desired zoom positions and change the focal length of the image-taking optical system.

Then, the structure and driving of the optical view finder unit will be explained using FIG. 5. FIG. 5(A) is an external perspective view showing the optical view finder unit and view finder driving member and FIG. 5(B) illustrates the optical view finder unit shown in FIG. 5(A) with the exterior member removed.

Figure 5:
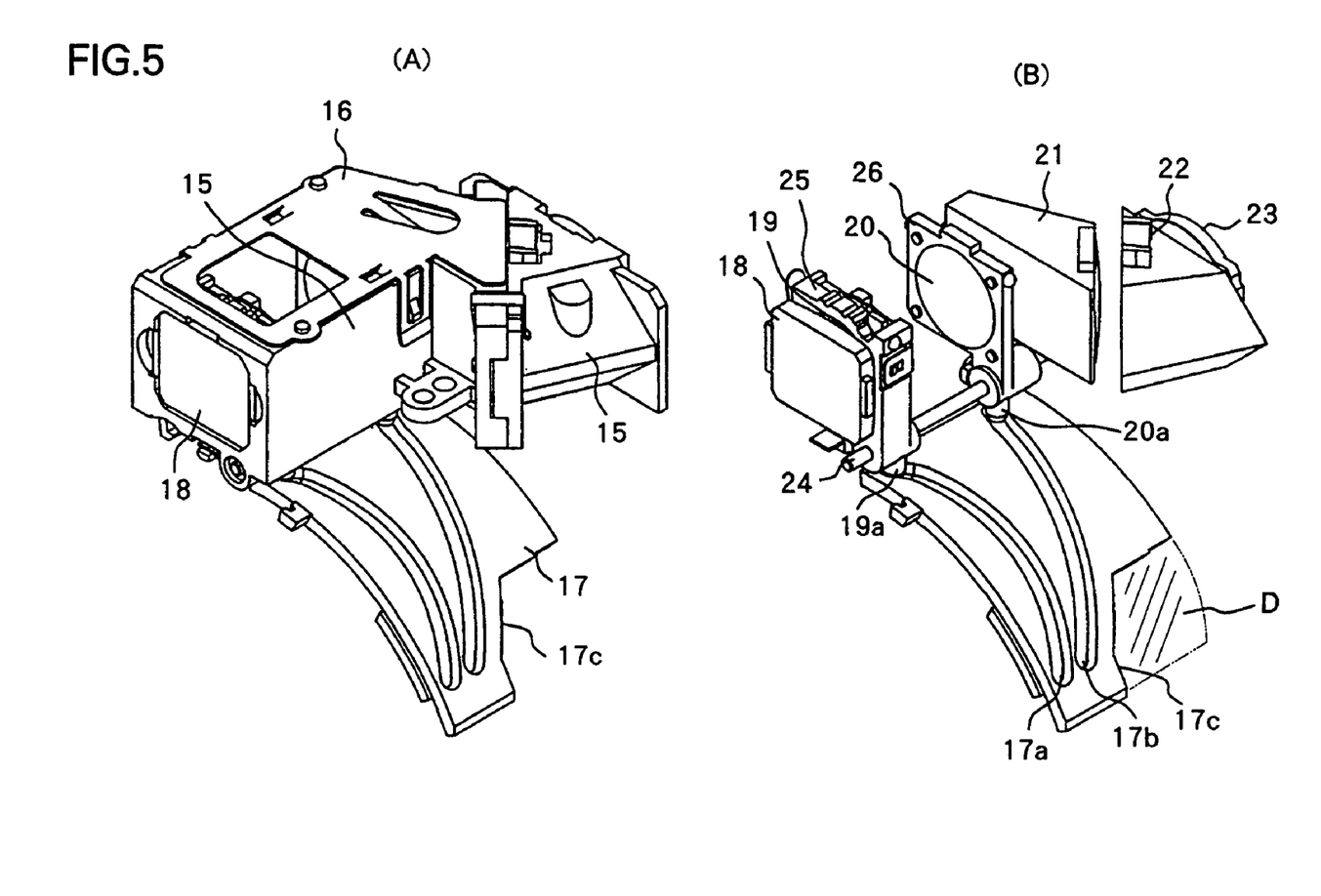
FIGS. 5(A) and 5(B) are an external perspective view of an optical view finder unit.

In FIG. 5, reference numeral 15 denotes a view finder holding member which holds a view finder lens unit, 16 denote a view finder cover which covers the upper surface of the view finder holding member 15. Reference numeral 18 denotes a view finder first lens unit and 19 denotes a view finder second lens unit. The view finder first lens unit 18 is fixed to the view finder holding member 15.

Reference numeral 25 denotes a first lens holding member which holds the view finder second lens unit 19 and is provided with a cam pin 19*a* which engages with a cam groove portion 17*a* formed in the view finder driving member 17. Furthermore, the first lens holding member 25 engages with a rectilinear shaft 24 which extends in the direction of the optical axis and can move along the rectilinear shaft 24.

Reference numeral 20 denotes a view finder third lens unit, 26 denotes a second lens holding member which holds the view finder third lens unit 20. The second lens holding member 26 is provided with a cam pin 20*a* which engages with a cam groove portions 17*b* formed on the view finder driving member 17. Furthermore, the second lens holding member 26 engages with the rectilinear shaft 24 and can move in the direction of the optical axis.

Reference numerals 21 and 22 denote prisms which guide an object light flux which has passed through the view finder lens units 18 to 20 to an eye piece lens 23. This allows the photographer to observe the object image by looking into the eye piece lens 23.

The relationship between the lens barrel 36 (rotary cylinder 8) and the view finder driving member 17 will be explained using FIG. 6.

The view finder driving member 17 is supported by the fixed cylinder 10 in a rotatable manner and rotates around the optical axis when the lens barrel 36 is driven as will be explained below.

Figure 6:
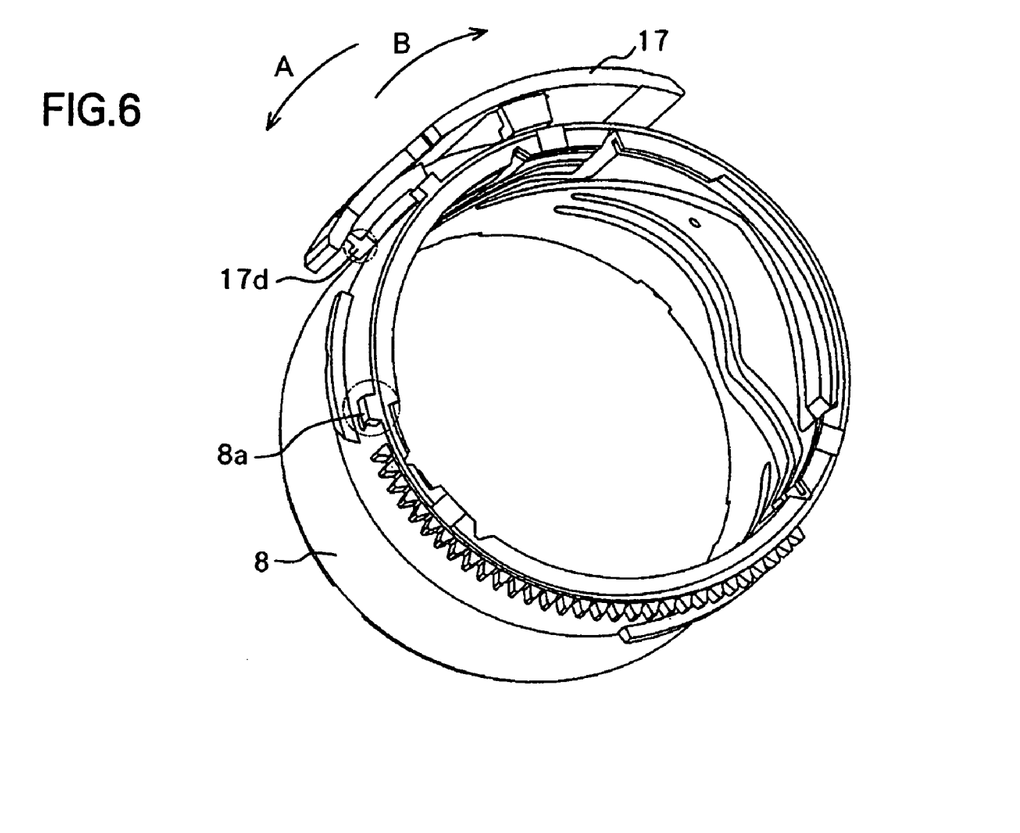
FIG. 6 is a view illustrating an interlock mechanism of the optical view finder unit.

The view finder driving member 17 is energized in the direction shown by arrow A in FIG. 6 by a spring (not shown) and with this end contacting the fixed cylinder 10, the view finder driving member 17 is held at a predetermined position (position shown in FIG. 5).

In the state shown in FIG. 6, when the rotary cylinder 8 rotates in the direction shown by arrow B by the zooming operation (protruding) of the lens barrel 36, a view finder driving portion 8*a* formed on the outer surface of the rotary cylinder 8 contacts a contact portion 17*d* formed on the inner surface of the view finder driving member 17.

Here, for a period until the view finder driving portion 8*a* contacts the contact portion 17*d*, only the rotary cylinder 8 rotates around the optical axis and in this way, the lens barrel 36 protrudes from a collapse state to an image-taking state (wide-angle state).

When the view finder driving portion 8*a* contacts the contact portion 17*d* and then the rotary cylinder 8 further rotates in the direction shown by arrow B, the rotary cylinder 8 causes the view finder driving member 17 to rotate in the direction shown by arrow B against the spring force of the spring. Here, the rotary cylinder 8 moves in the direction of the optical axis while rotating around the optical axis as described above, and therefore the view finder driving portion 8*a* operates in such a way as to squeeze the contact portion 17*d* in the direction shown by arrow B while sliding on the end face of the contact portion 17*d*.

On the other hand, when the rotary cylinder 8 rotates in the direction shown by arrow A by the zooming operation (retracting) of the lens barrel 36, the view finder driving member 17 rotates in the direction shown by arrow A in such a way as to follow the rotation operation of the rotary cylinder 8 by the spring force of the spring. Here, the view finder driving member 17 moves substantially along the outer surface of the rotary cylinder 8.

When the view finder driving member 17 rotates around the optical axis, the cam pins 19*a* and 20*a* are guided along the cam groove portions 17*a* and 17*b* as shown in FIG. 5, and the first lens holding member 25 (view finder second lens unit 19) and second lens holding member 26 (view finder third lens unit 20) move along the rectilinear shaft 24 in the direction of the optical axis.

At this time, the first lens holding member 25 and second lens holding member 26 move in such a way that the focal length of the view finder optical system becomes substantially equal to the focal length of the image-taking optical system.

As described above, by interlocking the lens barrel 36 and the optical view finder unit, it is possible to perform the zoom operation of the view finder optical system according to the zooming of the image-taking optical system. This allows the photographer to observe the screen corresponding to the image-taking screen by looking into the eye piece lens 23.

Then, the features of the camera of this embodiment will be explained.

Figure 4:
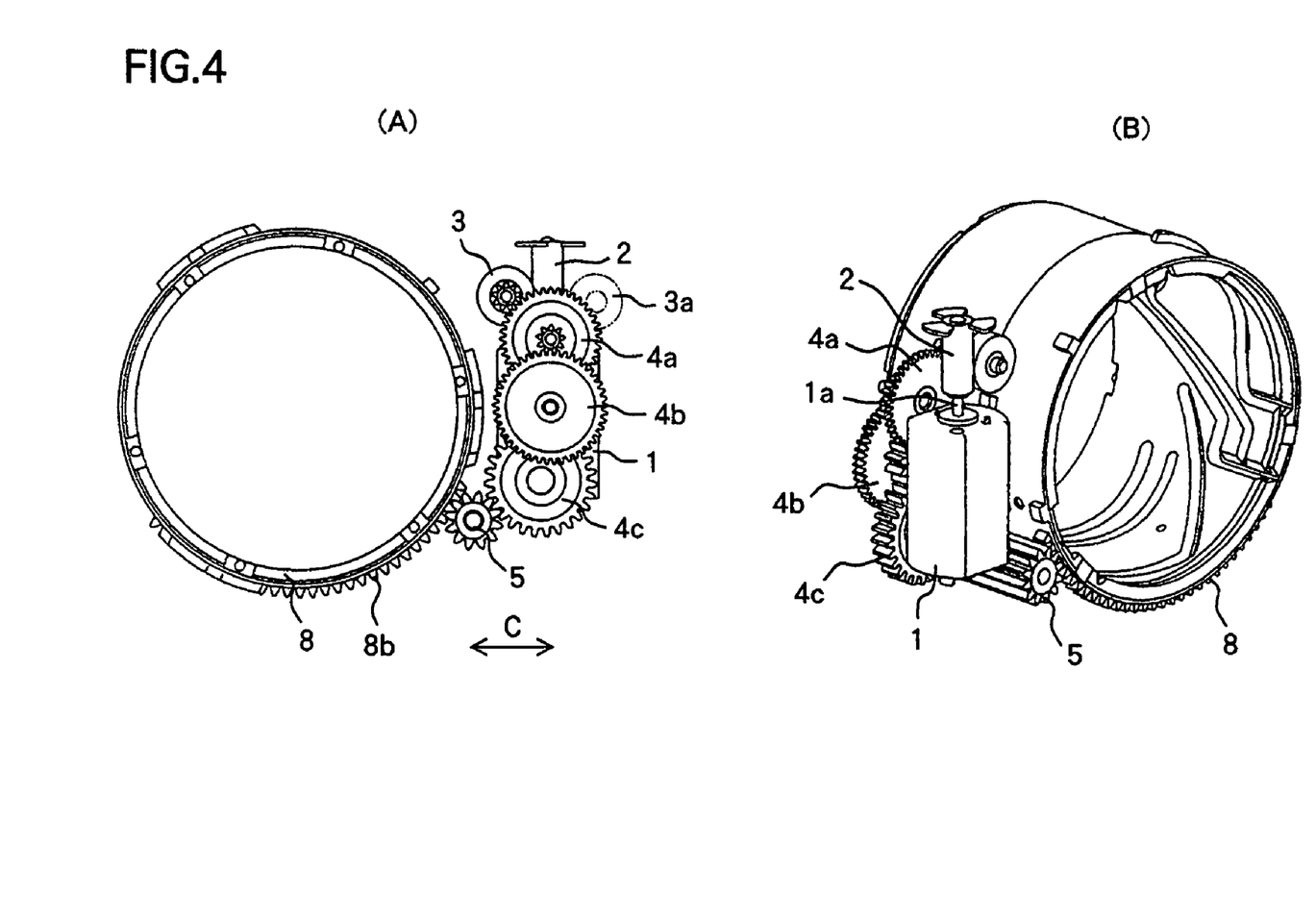
FIG. 4(A) is a front view of the driving mechanism and FIG. 4(B) is an external perspective view showing the driving mechanism of the lens barrel.

In the camera of this embodiment, to reduce the size of the camera body 31 in the vertical direction, the barrel driving mechanism having the barrel driving motor 1 and reduction gear train 2 to 5 is arranged on the side of the lens barrel 36 (FIG. 2 and FIG. 4). Furthermore, the camera of this embodiment is constructed so as to be able to reduce the size in the horizontal direction of the camera body 31 in the above described arrangement of the barrel driving mechanism.

In this embodiment, a plurality of gears 2 to 5 is used to decelerate the rotation output from the barrel driving motor 1 and transmit it to the lens barrel 36 (rotary cylinder 8) and these gears 2 to 5 are placed on the front side of the camera with respect to the barrel driving motor 1 as shown in FIG. 4.

Furthermore, as shown in FIG. 4(A), the barrel driving motor 1 and the plurality of gears 2 to 5 are arranged in such a way as to line up with each other in the direction of the optical axis, that is, to overlap with each other viewed from the front side or backside of the camera. Therefore, it is impossible to arrange the barrel driving motor 1 and the plurality of gears 2 to 5 in a necessary and sufficient area compactly.

The barrel driving motor 1 is placed in such a way that the rotation shaft 1*a* extends in the vertical direction (vertical direction in FIG. 4(A)) of the camera body 31 and the worm gear 2 and worm wheel 3 are used to connect the rotation shaft 1a and barrel driving gears 4. This makes it possible to convert rotation having the vertical direction of the camera body 31 as the rotation axis to rotation having the direction of the optical axis as the rotation axis and this embodiment makes it possible to arrange the barrel driving gears 4a to 4c in substantially parallel to the side of the barrel driving motor 1.

Furthermore, the rotation shaft 1a of the barrel driving motor 1 is placed away from the gear 8b formed on the outer surface of the rotary cylinder 8 in an upper part of the camera body 31 as shown in FIG. 4(A). This makes it possible to secure a space to arrange the reduction gear train 2 to 5 between the rotation shaft 1a and gear 8b and decelerate the torque of the barrel driving motor 1 and transmit it to the rotary cylinder 8.

On the other hand, as shown in FIG. 5, the cam groove portions 17a and 17b are formed in the view finder driving member 17, but the area other than the area where the cam groove portions 17a and 17b are formed, for example, the area shown by the shaded area D in FIG. 5(B) becomes unnecessary. The conventional view finder driving member has the area D.

Figure 8:
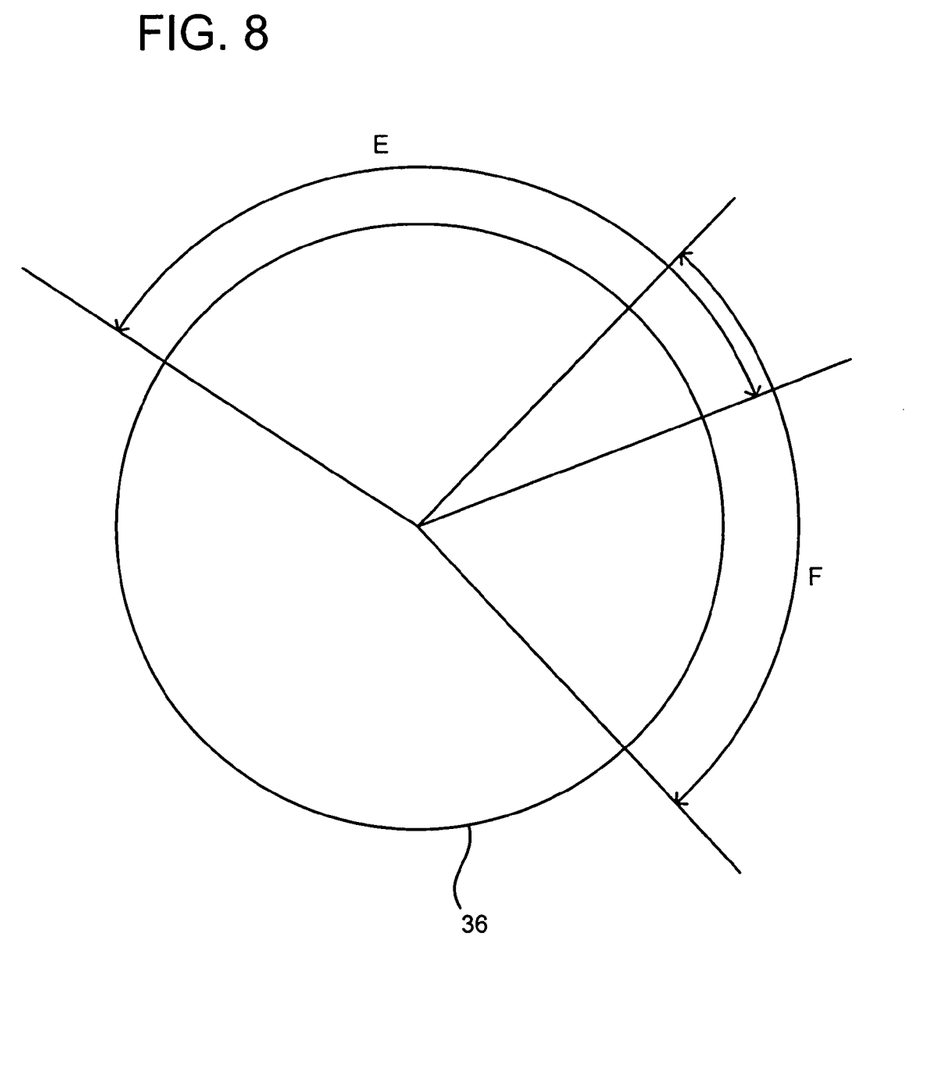
FIG. 8 is a view illustrating a moving area of the view finder driving member and a location area of the driving mechanism.

FIG. 8 is a schematic showing a moving area of the view finder driving member 17 and a configuration area of the barrel driving mechanism with respect to the lens barrel 36.

In FIG. 8, an area E (first area) is an area in which the view finder driving member 17 moves around the lens barrel 36 (rotary cylinder 8). Furthermore, an area F (second area) is an area in which the barrel driving mechanism is arranged around the lens barrel 36 (rotary cylinder 8). Here, the part of the area E and the part of the are F is overlapped with each other viewed from the front side of the lens barrel 36.

Figure 7:
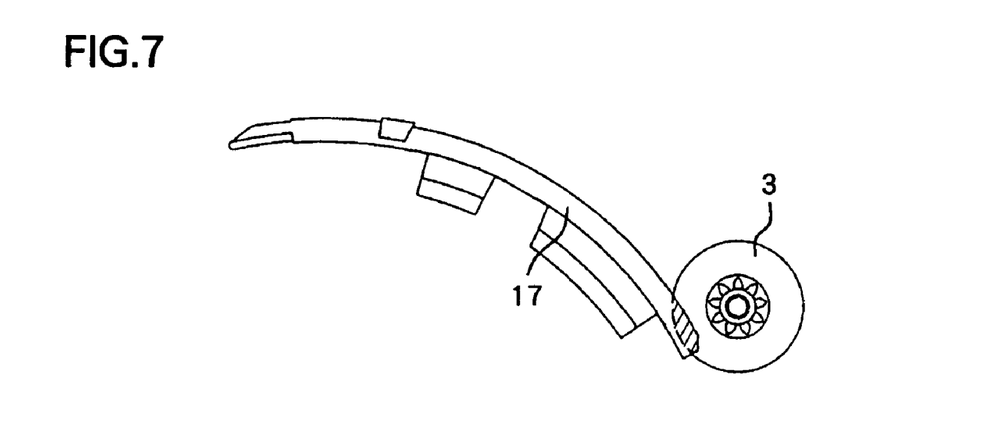
FIG. 7 is a view showing a layout of a view finder driving member and worm wheel.

Therefore, in this embodiment, the area D is expected to form a notch portion (recess portion) 17c in the view finder driving member 17. Then, the worm wheel 3 is placed in such a way that the part of the worm wheel 3 is positioned in the area corresponding to the moving track of the area D when the view finder driving member 17 moves along the perimeter of the rotary cylinder 8 (FIG. 7). At this time, the worm wheel 3 and view finder driving member 17 have an area where both overlap with each other viewed from the front side of camera as shown in the shaded area in FIG. 7.

In this embodiment, the notch portion 17c is formed in the view finder driving member 17, and therefore the view finder driving member 17 never collides with the worm wheel 3 even if the view finder driving member 17 rotates around the optical axis and never blocks the rotation of the view finder driving member 17 and worm wheel 3.

When the view finder driving member having the area D is used as in the case of the conventional art, it is necessary to place the worm wheel 3 at the position 3a in FIG. 4(A) to prevent collision between the view finder driving member and worm wheel 3.

In this arrangement, when viewed from the front of the lens barrel 36 as shown in FIG. 4(A), only the worm wheel at position 3a protrudes to the right of the area where the barrel driving mechanism is placed. In this case, it is not possible to arrange the member (e.g., spool chamber) placed in the camera body 31 close to the barrel driving mechanism by an amount of protrusion of the worm wheel, which increases the size of the camera body 31 in the lateral direction (direction indicated by arrow C in FIG. 4(A)).

Therefore, the worm wheel 3 is arranged close to the lens barrel 36 (rotary cylinder 8) to repress only the worm wheel 3 from protruding and allows the member arranged on the periphery of to the barrel driving mechanism to be arranged close to the barrel driving mechanism, thus making it possible to reduce the size of the camera in the horizontal direction.

According to the camera of this embodiment, by arranging the barrel driving mechanism having the barrel driving motor 1 and the reduction gear train 2 to 5 on the side of the lens barrel 36, it is possible to reduce the size of the camera in the vertical direction compared to the case where the barrel driving mechanism is arranged below the lens barrel 36.

Furthermore, by arranging the barrel driving motor 1 and reduction gear train 2 to 5 so that they overlap with one another viewed from the front side (or backside) of camera, it is possible to arrange the barrel driving mechanism more compactly.

Furthermore, by forming the notch portion 17c in the view finder driving member 17 and arranging the worm wheel 3 in such a way that the part of the worm wheel 3 is located in a free space formed by the notch potion 17c when the view finder driving member 17 rotates to the barrel driving mechanism side, it is possible to reduce the size of the camera in the horizontal direction.

That is, it is possible to prevent interference between the worm wheel 3 and view finder driving member 17 and arrange the worm wheel 3 (barrel driving mechanism) close to the lens barrel 36 (rotary cylinder 8), and thereby reduce the size of the camera body 31 in the horizontal direction.

In this embodiment, as described above, the size of the camera in the vertical direction (in the camera height direction) can be reduced and the size in the horizontal direction (camera lateral direction) can be further reduced.

While preferred embodiment has been described, it is to be understood that modification and variation of the present invention may be made without departing from scope of the following claims.

What is claimed is:

1. A camera comprising:
   a lens barrel which allows the focal length of an image-taking optical system to be changed;
   a view finder unit for observing an object image;
   a cam member having a cam for driving the view finder unit, which moves around the lens barrel in a first area; and
   a barrel driving mechanism which is arranged around the lens barrel in a second area and drives the lens barrel;
   wherein the section positioned the second area side in the first area and the second area are overlapped with each other, and the cam member has recess portion to avoid contacting the barrel driving mechanism when the cam member moves into the section.

2. The camera according to claim 1, wherein the recess portion is formed in the area other than the cam forming area.

3. The camera according to claim 1, wherein the barrel driving mechanism has a driving source and a gear train which transmits the driving force from the driving source to the lens barrel, and when the cam member moves into the section the part of the gear train and the recess portion overlap with each other viewed in the direction of the optical axis.

4. The camera according to claim 3, wherein the driving source and the gear train are arranged so as to overlap with each other view in the direction of the optical axis.

* * * * *